United States Patent
Hainz et al.

(10) Patent No.: US 11,248,659 B2
(45) Date of Patent: Feb. 15, 2022

(54) PRODUCING A CAGE FOR A CONSTANT-VELOCITY BALL JOINT

(71) Applicant: GKN Driveline Deutschland GmbH, Offenbach am Main (DE)

(72) Inventors: Volker Hainz, Ortenberg (DE); Norbert Krancioch, Offenbach (DE); Johannes Günther, Seckmauern (DE)

(73) Assignee: GKN Driveline Deutschland, Offenbach am Main (DE)

( * ) Notice: Subject to any disclaimer, the term of this patent is extended or adjusted under 35 U.S.C. 154(b) by 306 days.

(21) Appl. No.: 16/317,172

(22) PCT Filed: Jul. 13, 2017

(86) PCT No.: PCT/EP2017/067710
§ 371 (c)(1),
(2) Date: Jan. 11, 2019

(87) PCT Pub. No.: WO2018/011346
PCT Pub. Date: Jan. 18, 2018

(65) Prior Publication Data
US 2019/0226528 A1    Jul. 25, 2019

(30) Foreign Application Priority Data
Jul. 15, 2016 (DE) .................... 10 2016 113 139.3

(51) Int. Cl.
*F16D 3/223* (2011.01)
*B21D 53/12* (2006.01)

(52) U.S. Cl.
CPC ............. *F16D 3/223* (2013.01); *B21D 53/12* (2013.01); *F16D 2003/22303* (2013.01);
(Continued)

(58) Field of Classification Search
CPC .. F16D 3/223; F16D 2300/12; F16D 2250/00; F16D 2250/0023;
(Continued)

(56) References Cited

U.S. PATENT DOCUMENTS 3,675,292 A * 7/1972 Vannest ................ F16C 33/467
29/898.067
3,815,381 A  6/1974 Wagner
(Continued)

FOREIGN PATENT DOCUMENTS

CN   101067422 A   11/2007
CN   102792042 A   11/2012
(Continued)

OTHER PUBLICATIONS

CPO First Office Action and Search Report for Application No. 201780057063.2 dated Sep. 24, 2020 (with English translation; 13 pages).
(Continued)

*Primary Examiner* — Greg Binda
(74) *Attorney, Agent, or Firm* — Bejin Bieneman PLC

(57) ABSTRACT

A cage for a constant-velocity ball joint is annular and has cage windows arranged spaced apart from one another along a circumferential direction for guiding balls of the constant-velocity ball joint; wherein each cage window has at least on one side a ball guiding surface facing in an axial direction. The cage can be produced by:
a) providing a cage having cage windows;
b) applying at least one compressive force via an outer circumferential surface of the cage, facing in a radial direction, in a first region of at least one ball guiding surface of at least one cage window;
c) deforming the cage in the first region of the at least one ball guiding surface, so that the at least one ball guiding
(Continued)

surface is displaced inwardly in the radial direction with respect to an adjacent second region of the cage.

10 Claims, 7 Drawing Sheets

(52) U.S. Cl.
CPC .. *F16D 2250/00* (2013.01); *F16D 2250/0023* (2013.01); *F16D 2300/12* (2013.01); *Y10S 464/906* (2013.01); *Y10T 29/49691* (2015.01)

(58) Field of Classification Search
CPC ........... F16D 2003/22303; B21D 53/12; Y10S 464/906; Y10T 29/49691
USPC ........................ 464/145; 72/370.23; 384/534
See application file for complete search history.

(56) References Cited

U.S. PATENT DOCUMENTS

| | | | |
|---|---|---|---|
| 4,231,232 A | 11/1980 | Otsuka et al. | |
| 8,419,554 B2 * | 4/2013 | Szentmihalyi | F16D 3/223 464/145 |
| 2007/0259724 A1 | 11/2007 | Pohl | |

FOREIGN PATENT DOCUMENTS

| | | | | |
|---|---|---|---|---|
| EP | 0927832 A1 | | 7/1999 | |
| FR | 1.353.407 | * | 1/1964 | ................... 464/146 |
| JP | 2009287641 A | | 12/2009 | |
| WO | 9930052 A1 | | 6/1999 | |
| WO | 2005057035 A1 | | 6/2005 | |
| WO | 2014121832 A1 | | 8/2014 | |
| WO | 2015076051 A1 | | 5/2015 | |

OTHER PUBLICATIONS

International Search Report and Written Opinion for PCT/EP2017/067710 dated Oct. 27, 2017 (11 pages; with English translation).

* cited by examiner

PRODUCING A CAGE FOR A CONSTANT-VELOCITY BALL JOINT

CROSS-REFERENCE TO RELATED APPLICATIONS

This application is a national stage of, and claims priority to, Patent Cooperation Treaty Application No. PCT/EP2017/067710, filed on Jul. 13, 2017, which application claims priority to German Application No. DE 10 2016 113 139.3, filed on Jul. 15, 2016, which applications are hereby incorporated herein by reference in their entireties.

BACKGROUND

Constant-velocity slip ball joints (also referred to hereinafter as a joint or constant-velocity ball joint) are used in particular in passenger cars, in the area of side shafts or in longitudinal shaft assemblies. The longitudinal shafts serve for transmitting the driving force from a transmission to an axle. In particular, the transmission is in this case arranged in the front region of a motor vehicle and the longitudinal shaft assembly serves for transmitting the driving forces from this transmission to a rear axle. In the case of such uses, the constant-velocity slip ball joints must be configured such that they are equally compact and lightweight and on the other hand have high fatigue strength.

Constant-velocity slip ball joints are known for example from WO 2005/057035 A1 or WO 2014/121832 A1. Also described there are further possible uses and general requirements for these joints, which can be used here for purposes of explanation.

Constant-velocity slip ball joints with a cage have at least one outer joint part with an axis of rotation and with outer ball tracks and also an inner joint part with inner ball tracks. Constant-velocity slip ball joints also comprise a multiplicity of torque-transmitting balls, which are in each case guided in outer and inner ball tracks assigned to one another, and the cage, which is provided with a multiplicity of cage windows, which in each case receive one or more of the balls.

The torque-transmitting balls are in particular held by the ball cage in a constant-velocity plane and are guided by corresponding pairs of outer and inner ball tracks. In particular, in the mounting region and in the operating region the ball tracks run along the axis of rotation of the joint and are at a constant distance (in a radial direction) from the axis of rotation. In particular, one ball or two balls are arranged in each cage window. Constant-velocity slip ball joints preferably have at least 6 or 6+2n (n=1, 2, 3, . . . ) balls. The cage moves with the balls along the axis of rotation of the outer joint part in the axial direction.

In particular, at least individual tracks of the outer and/or inner ball tracks run in an inclined manner or at a track slanting angle with respect to the central axis. This means that the balls move along the ball tracks not only in the axial direction but also in the circumferential direction.

Especially in the area of mass production, for example of motor vehicles, there is the desire to provide all of the components at a reduced weight and/or reduced costs. At the same time, a high fatigue strength of the constant-velocity ball joint and the assembly during use is to be ensured.

SUMMARY

The present disclosure relates to a method for producing a cage for a constant-velocity ball joint and to a cage for a constant-velocity ball joint itself. A cage described here is preferably used in constant-velocity slip ball joints. When testing certain types of constant-velocity slip ball joints, it has been found that spalling of the surface of the cage can occur in the region of zones of the cage that are in contact with the balls. The cause has been identified as being that, in the case of these types of constant-velocity slip ball joints, for structural design reasons the balls move very closely to the inner circumferential surface of the cage, and consequently the ball guiding surfaces on the cage are there highly stressed. The damage to the cage that occurs may lead to a reduction in the service life of the joint.

It has been attempted to reduce this effect by providing the cage windows in such a way that they are adapted to this movement behavior. Thus, after the punching, the for example kidney-shaped cage windows in the cage are subjected to a calibrating process. In the process, a calibrating mandrel is arranged in the cage window and the complete cage is subsequently upset by a compressive force acting in an axial direction. This upsetting of the cage brings about a flow of material in the cage, by which a ball guiding surface in the cage window is enlarged inwardly in a radial direction. In the process, the material of the cage in the region of the ball guiding surfaces arranged on the sides of the cage facing in the axial directions is displaced inwardly in the radial direction. However, this bulging on the inner circumferential surface is not definable in terms of the structural design because a relatively uncontrolled flow of material takes place. In particular, the outer circumferential surface of the cage is in this case supported by a die, so that a displacement of the material only takes place inwardly in the radial direction.

On this basis, disclosed herein is a method for producing a cage by which a structurally definable re-forming of the cage in the region of the ball guiding surfaces is possible. The performing capability of the constant-velocity slip ball joint during operation is to be ensured. The lifetime of the constant-velocity slip ball joint is to be increased. Further disclosed is a cage that is in particular produced by the method and has a suitably re-formed cage guiding surface.

This is achieved by a method according to the features described herein and by a cage according to the features described herein. Advantageous embodiments are the subject of the dependent claims. The features that are individually presented in the claims can be combined with one another in a technologically meaningful way and can be supplemented by explanatory substantive matter from the description and details from the figures, showing further variants.

A method for producing a cage for a constant-velocity ball joint is disclosed, wherein the cage is annular and has cage windows which are arranged spaced apart from one another along a circumferential direction and are intended for guiding balls of the constant-velocity ball joint. Each cage window has at least on one side a ball guiding surface facing in an axial direction. The method comprises at least the following steps:

a) providing a cage having cage windows;
    b) applying at least one compressive force via an outer circumferential surface of the cage, facing in a radial direction, in a first region of at least one ball guiding surface of at least one cage window;
    c) deforming the cage in the first region of the at least one ball guiding surface, so that the at least one ball guiding surface is displaced inwardly in the radial direction with respect to an adjacent second region of the cage.

In particular, the cage has (in step a)) an (at least partially or predominantly) spherically (for example ball-like) formed outer circumferential surface. In at least one lateral peripheral region, the outer circumferential surface may be conically formed.

Preferably, the cage has (in step a)) an (at least partially or predominantly) spherically formed inner circumferential surface. In at least one lateral peripheral region, the inner circumferential surface may be conically formed.

In step a) the cage is provided, having, for example kidney-shaped, in particular punched-out, cage windows. In step b), an outer circumferential surface of the cage facing in a radial direction is subjected to a compressive force, in particular (exclusively) in the first region of a (preferably all of the) ball guiding surface(s). In step c), the cage is (plastically) deformed in this first region as a result of the compressive force. In the process, the first region is displaced inwardly in the radial direction with respect to a second region arranged adjacently in the circumferential direction.

After step c), the cage has in all regions, apart from in the re-formed first regions, in particular a uniformly spherically formed outer circumferential surface (substantially unchanged by this method) or a uniformly spherically formed inner circumferential surface (substantially unchanged by this method).

With respect to these other regions, the re-formed first regions are in each case arranged such that they are displaced or offset inwardly in the radial direction.

The compressive force acts in particular in the radial direction on the outer circumferential surface. In particular, it additionally acts in the axial direction on the outer circumferential surface. In particular, no (or only a much smaller) compressive force acts on the end faces of the cage.

In particular, additional holding forces act on the cage, but bring about (virtually) no (plastic) deformations at their points of application on the cage.

In particular, a (plastic) deformation of the cage takes place exclusively in the first region of the ball guiding surfaces.

In particular, between steps a) and b) or after step c), in a further step i), a calibrating mandrel is arranged in at least one cage window, in particular in each cage window. At least during step c) (possibly also during step b) or in an upsetting operation following step i)), the at least one ball guiding surface comes to lie against the (respective) calibrating mandrel.

The upsetting operation comprises applying a compressive force acting in the axial direction via the end faces of the cage.

In the upsetting operation, the at least one ball guiding surface may be displaced along the axial direction, so that a distance between the ball guiding surfaces lying opposite one another in a cage window is reduced.

Once the at least one ball guiding surface has come to lie against the calibrating mandrel, the upsetting operation can be continued, so that (second) regions arranged alongside the ball guiding surfaces are displaced further along the axial direction, while the ball guiding surfaces (in the first region) are fixed by the calibrating mandrel.

According to an embodiment, in step c) or in an upsetting operation following step i), the cage is deformed in the first region of the at least one ball guiding surface in such a way that the at least one ball guiding surface is (additionally) displaced in the axial direction with respect to an adjacent second region of the cage, in particular because during the upsetting operation the first region butts against the calibrating mandrel and the second region is displaced further inwardly in the axial direction. This deformation in the direction of the axial direction ensures in particular that the ball guiding surfaces of a ball window that are arranged lying opposite one another in the axial direction are at a predetermined distance from one another.

According to a further embodiment, after step c) or after step i) or after the upsetting operation following step i), a mechanical working of the cage guiding surface is performed (for example by milling). The required distance is exactly set by this mechanical working.

According to an embodiment, the at least one cage window has on each of both sides lying opposite one another a ball guiding surface, wherein, in step c), both ball guiding surfaces are at least displaced inwardly in the radial direction with respect to the second regions of the cage that are adjacent (to the first region in the circumferential direction).

In particular, a wall thickness (in particular measured in a radial direction) of the cage in the first region of the cage guiding surface remains constant during step c), and in particular also during an upsetting operation following step i). Preferably, therefore, no flow of material into the first region of the cage guiding surface takes place, but instead the material present in the first region is at least displaced in the radial direction with respect to the adjacent second regions.

Also disclosed is a cage for a constant-velocity ball joint that is produced in particular by the method newly described here.

The cage is annular and has cage windows which are arranged spaced apart from one another along a circumferential direction and are intended for guiding balls of the constant-velocity ball joint. Each cage window has at least on one side a ball guiding surface facing in an axial direction, wherein the cage has in the first region of the ball guiding surface a smallest inside diameter and a smallest outside diameter in a cross section transverse to an axis of rotation of the cage.

In particular, the cage has in the first region of the ball guiding surface a wall portion that is displaced inwardly in the radial direction with respect to an adjacently arranged second region.

In particular, the smallest inside diameter (in the unformed first region) differs from an inside diameter of a second region of the cage arranged (directly) alongside by at most 3.0%, e.g., at most 1.0%. In particular, the smallest inside diameter (in the unformed first region) differs from an inside diameter of a second region of the cage arranged (directly) alongside by at least 0.3%, e.g., at least 0.5%.

In particular, the smallest outside diameter (in the unformed first region) differs from an outside diameter of a second region of the cage arranged (directly) alongside by at most 3.0%, e.g., at most 1.0%. For example, the smallest outside diameter (in the unformed first region) differs from an outside diameter of a second region of the cage arranged (directly) alongside by at least 0.3%, e.g., at least 0.5%.

In particular, the cage extends in the axial direction between a first end face and a second end face, wherein the cage has between the ball guiding surface and each end face in the axial direction lands running in the circumferential direction. At least a part of at least one land that extends in the axial direction is displaced inwardly in the radial direction in a first region with respect to a (second) region of the cage that is adjacent (in the circumferential direction and/or in the axial direction toward the end face). In particular, the entire land (that is to say in the axial direction between the ball guiding surface and at least one end face) is displaced inwardly in the radial direction in a first region with respect to a second region of the cage that is adjacent (in the circumferential direction).

Also disclosed is a system comprising a constant-velocity ball joint with a cage, wherein the cage has been produced by the newly disclosed method and/or is configured in the way described above. The constant-velocity ball joint can be a constant-velocity slip ball joint, in which the cage is arranged displaceably along an axial direction with respect to an outer joint part and/or an inner joint part.

The statements made with respect to the novel method equally apply to the novel cage and the novel joint, and vice versa.

Therefore, furthermore, a motor vehicle that comprises at least one shaft assembly as specified above is also disclosed.

The radial calibration of the cages explained here, by pressing or forming inwardly offset portions of the cage windows, may lead in particular to at least one of the following advantages:
- still greater window areas in comparison with the prior art, whereby the ball runs in the window in a centered manner, which may lead to an increase in the service life,
- a reliable and manageable re-forming process,
- more material under the ball during operation, which may lead to an increase in strength.

SUMMARY OF THE DRAWINGS

The present subject matter will be discussed in more detail below on the basis of the figures. It is pointed out that the invention is not intended to be restricted by the exemplary embodiments shown. In particular, unless explicitly stated otherwise, it is also possible for partial aspects of the substantive matter explained in the figures to be extracted and combined with other constituent parts and findings from the present description and/or figures. The same reference signs denote identical objects, and so where appropriate explanations from other figures can be used in a supplementary manner. In the figures, in each case schematically.

DESCRIPTION

Figure 10:
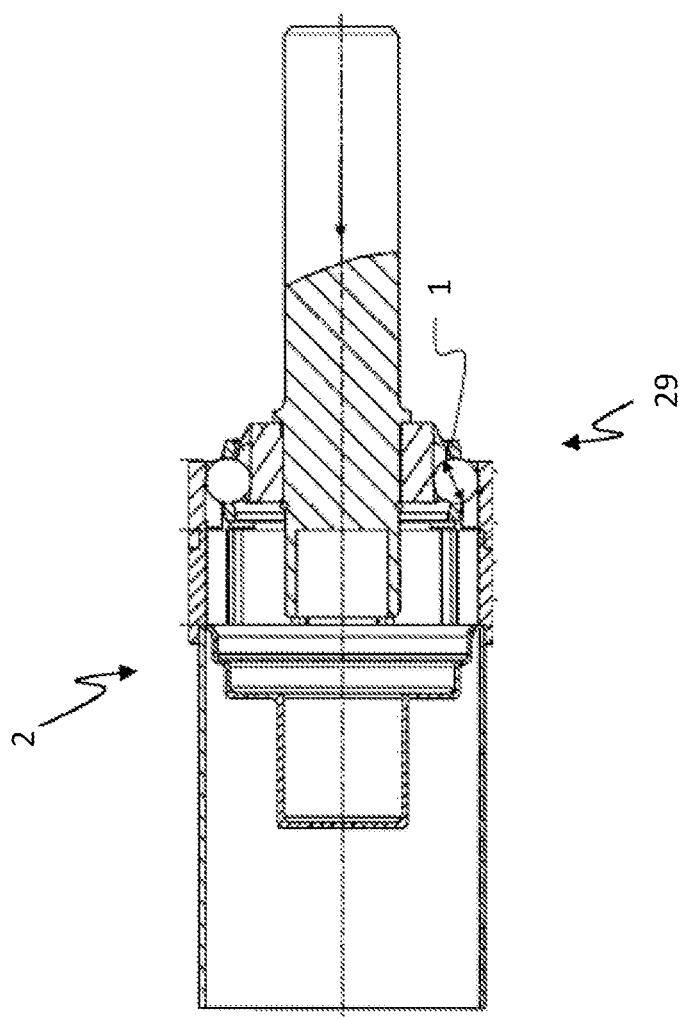
FIG. 10: shows a system comprising a constant-velocity slip ball joint and the cage.

The constant-velocity slip ball joint 2 comprising the cage 1 is shown in FIG. 10. FIG. 10 shows a system 29 comprising the constant-velocity slip ball joint 2 and the cage 1.

Figure 1:
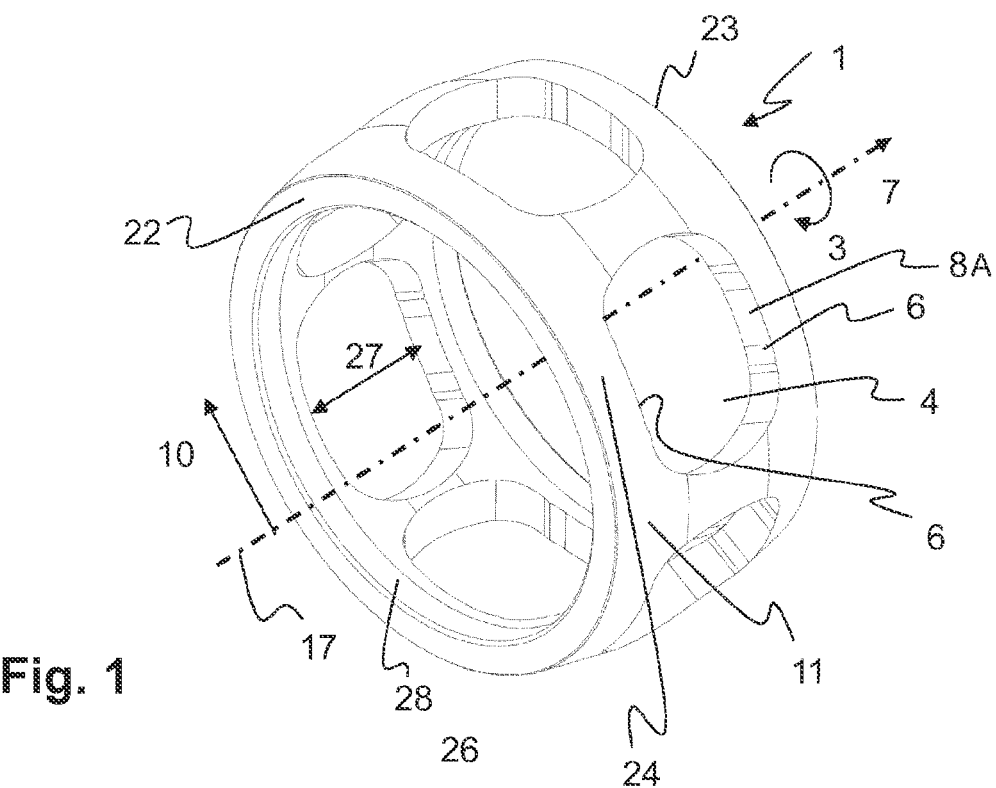
FIG. 1: shows a known cage in a perspective view.

FIG. 1 shows a known cage 1 in a perspective view. The cage 1 is annular and has an axis of rotation 17 and also cage windows 4, which are arranged spaced apart from one another along a circumferential direction 3 and are intended for guiding balls 5 of the constant-velocity ball joint 2. Each cage window 4 has on each of both sides 6 a ball guiding surface 8A facing in an axial direction 7. The cage 1 has a spherically (for example ball-like) formed outer circumferential surface 11 and also a spherically formed inner circumferential surface 28.

The cage 1 extends in the axial direction 7 between a first end face 22 and a second end face 23, wherein the cage 1 has, between the ball guiding surface 8A and each end face 22, 23 in the axial direction 7, lands 24 running in the circumferential direction 3.

Figure 2:
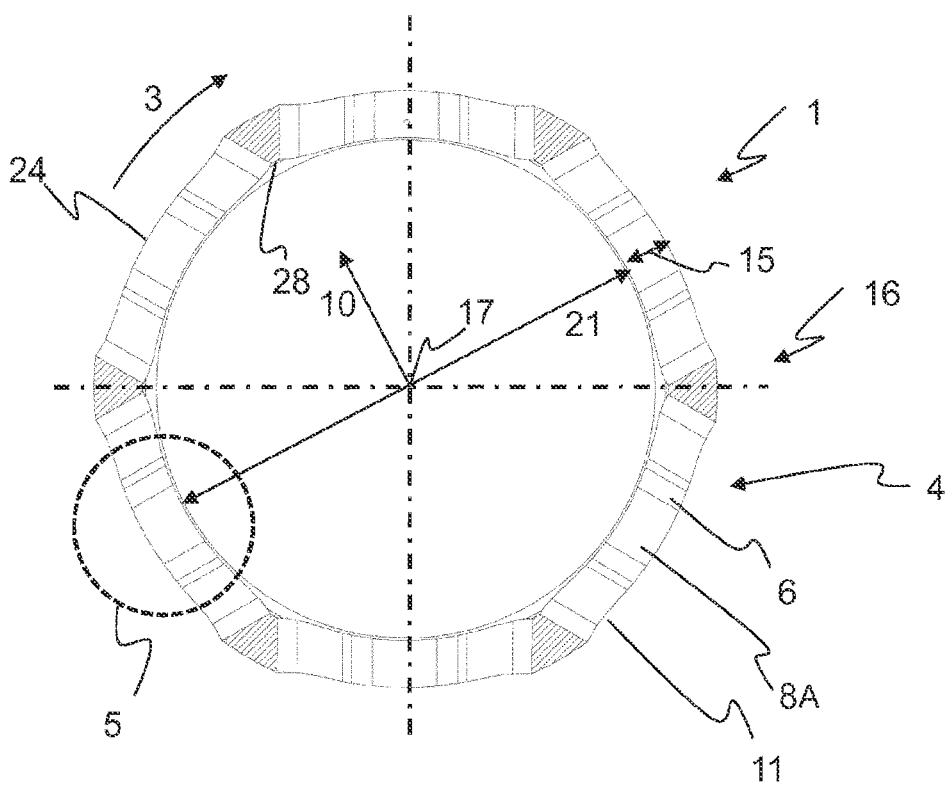
FIG. 2: shows a cross section of the cage as shown in FIG. 1.

FIG. 2 shows a cross section 16 of the cage 1 as shown in FIG. 1. The balls 5 are arranged in the cage windows 4 and contact the cage 1 at the ball guiding surfaces 8A, in particular at the contact point 26 in the vicinity of the inner circumferential surface 28. The cage 1 has at least in the region of the cage guiding surfaces 8A a wall thickness 15 in the radial direction 10.

Figure 3:
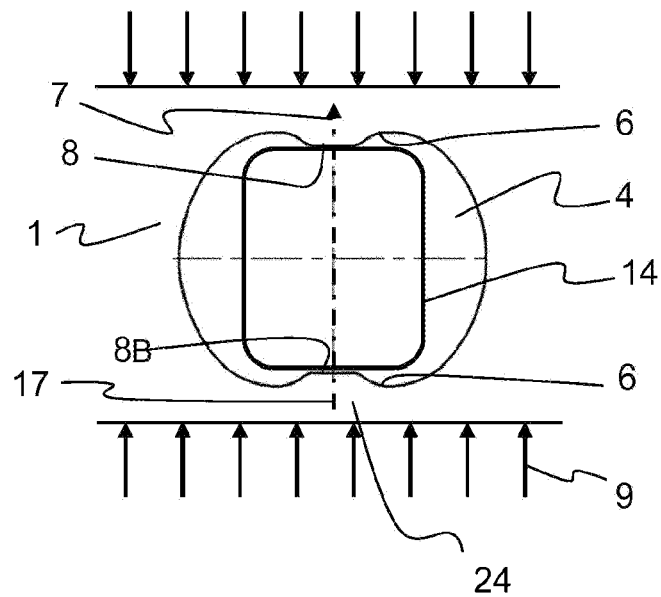
FIG. 3: shows a known calibrating method for a cage.

FIG. 3 shows a known calibrating method for a cage 1. After the punching of the cage windows 4, shown here as kidney-shaped, into the cage 1, a calibrating process is carried out. In the process, a calibrating mandrel 14 is arranged in the cage window 4, and subsequently the complete cage 1 is upset by a compressive force 9 acting in an axial direction 7. This upsetting of the cage 1 brings about a flow of material in the cage 1, by which a (pre-axial compression) ball guiding surface 8B in the cage window 4 is enlarged inwardly in a radial direction 10 (see FIG. 4). Furthermore, a distance 27 between the ball guiding surfaces 8B lying opposite one another can be exactly set by the upsetting operation.

Figure 4:
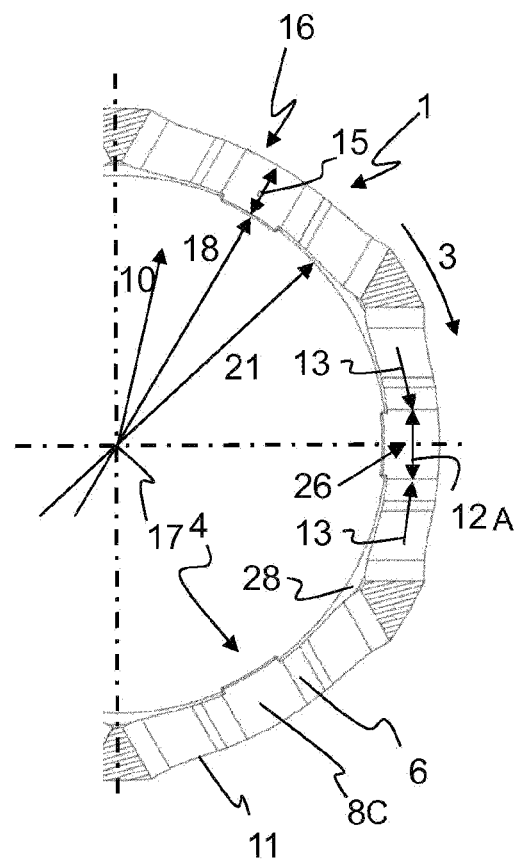
FIG. 4: shows a cage produced by the calibrating method as shown in FIG. 3 in a cross section.
Figure 5:
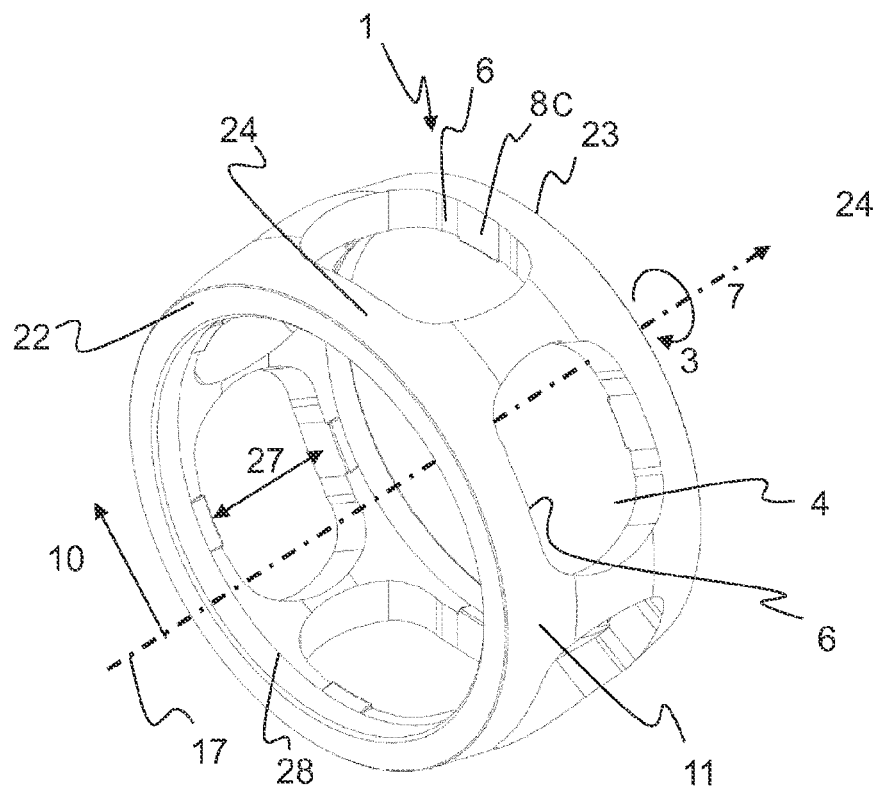
FIG. 5: shows the cage as shown in FIG. 4 in a perspective view.

FIG. 4 shows a cage 1 produced by the calibrating method as shown in FIG. 3 in a cross section 16. FIG. 5 shows the cage 1 as shown in FIG. 4 in a perspective view. FIGS. 4 and 5 are described together below.

The calibrating method has the effect that the material of the cage 1 in the first region 12 of the (post-axial compression) ball guiding surfaces 8C arranged on the sides 6 of the cage 1 facing in the axial directions 7 is displaced inwardly in the radial direction 10. This bulging on the inner circumferential surface 28 is not definable in terms of the structural design because a relatively uncontrolled flow of material takes place. As a result of the calibrating method, the wall thickness 15 in the first region 12A of the ball guiding surface 8C is enlarged (inwardly in the radial direction 10). Correspondingly, the cage 1 has a smallest inside diameter 18 in the first region 12A of the ball guiding surfaces 8C. In the second regions 13, adjacent to the first region 12A, the cage 1 has a greater inside diameter 21.

The enlargement of the ball guiding surface 8C inwardly in the radial direction 10 has the effect that (premature) damage in the region of the ball guiding surface 8C close to the inner circumferential surface 28 can be prevented.

Figure 6:
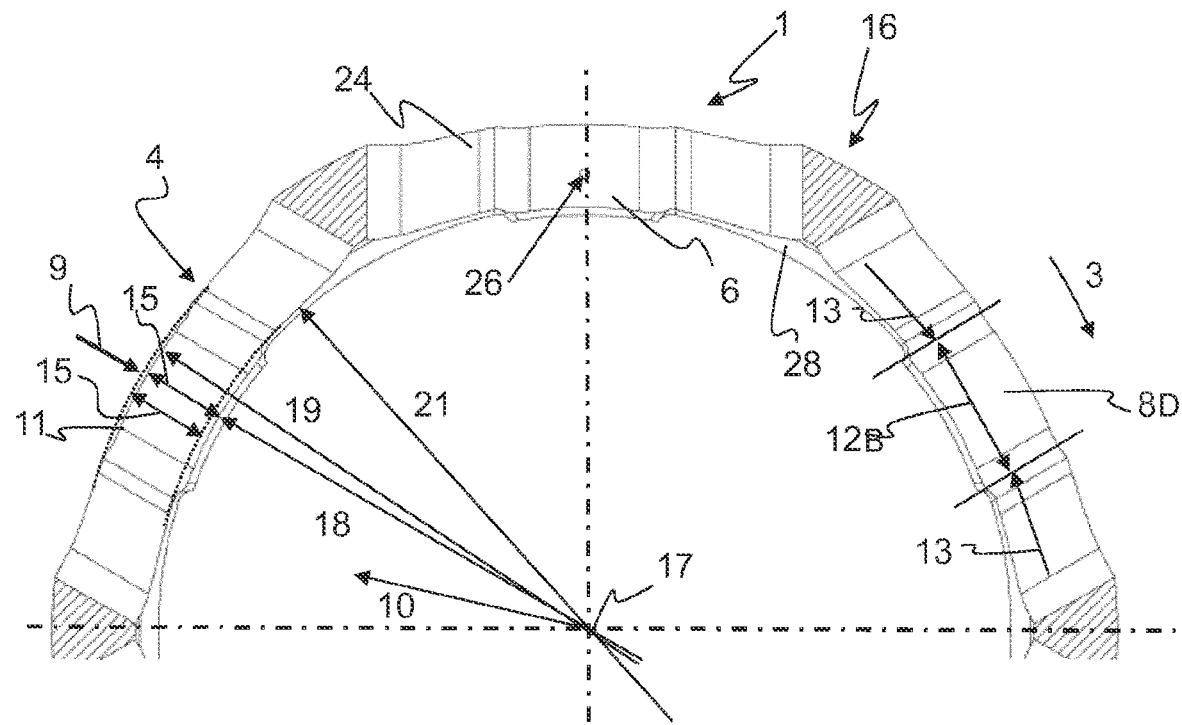
FIG. 6: a cage produced by the method in cross section.
Figure 7:
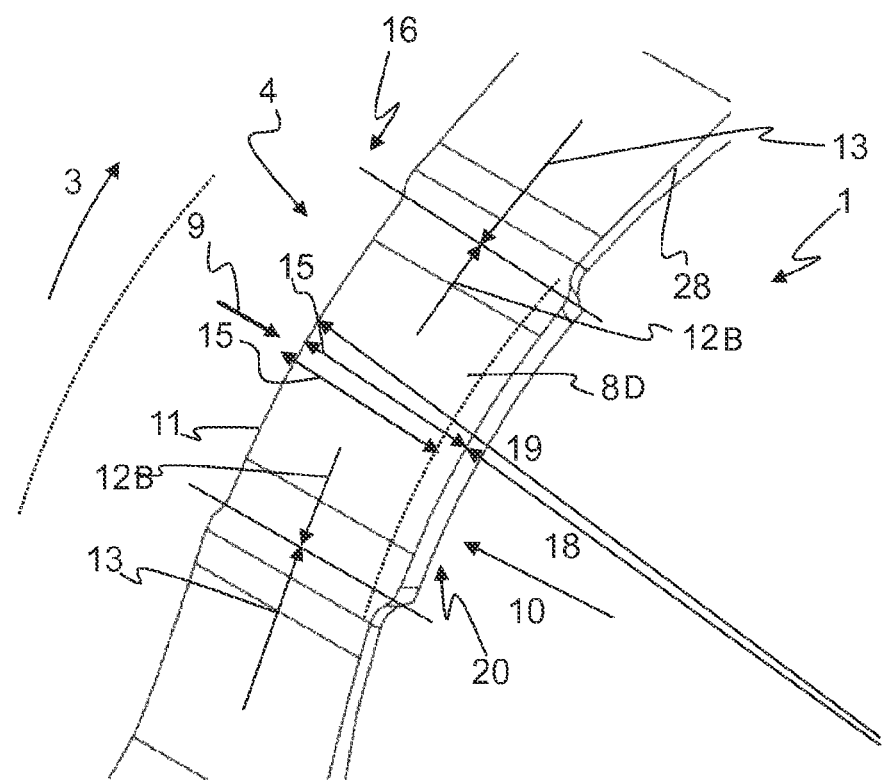
FIG. 7: shows a detail from FIG. 6.
Figure 8:
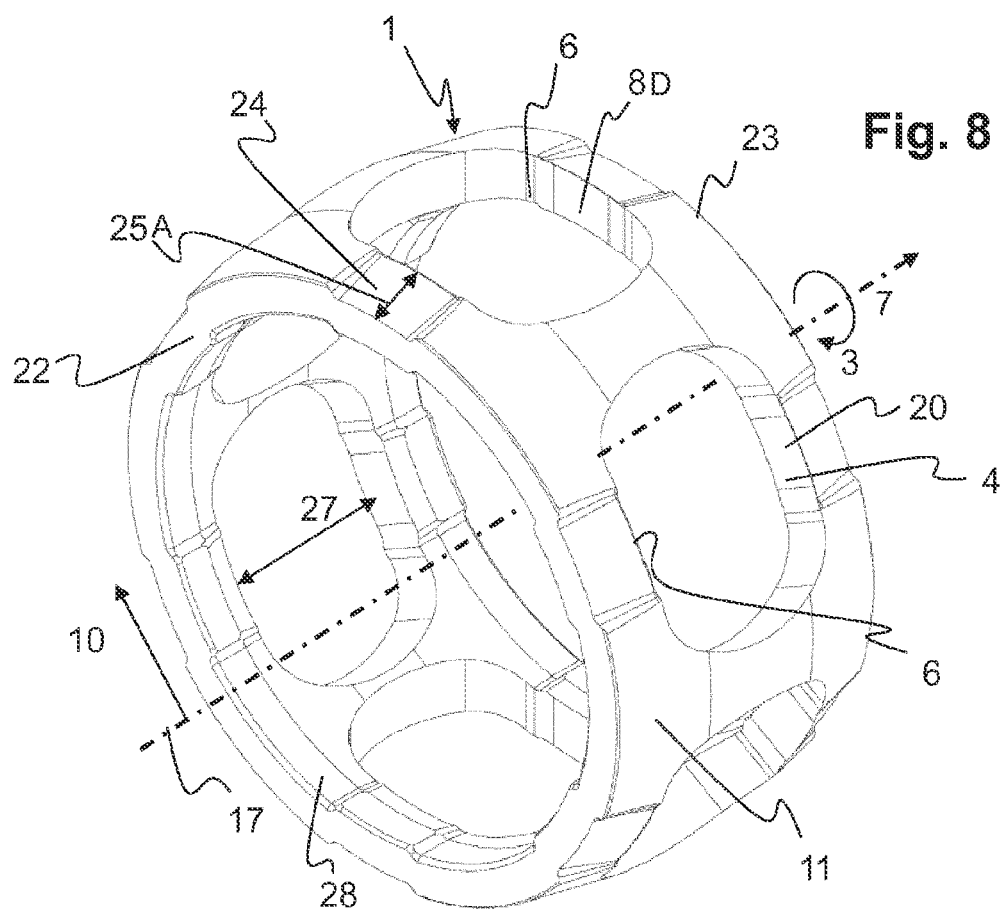
FIG. 8: shows the cage as shown in FIGS. 6 and 7 in a perspective view

FIG. 6 shows a cage 1 produced by the method in cross section. FIG. 7 shows a detail from FIG. 6. FIG. 8 shows the cage 1 as shown in FIGS. 6 and 7 in a perspective view. FIGS. 6 to 8 are described together below.

The cage 1 is annular and has cage windows 4, which are arranged spaced apart from one another along a circumferential direction 3 and are intended for guiding balls 5 of the constant-velocity ball joint 2. Each cage window 4 has on each side 6 a (post-radial compression) ball guiding surface 8D facing in an axial direction 7. By applying a compressive force 9 via an outer circumferential surface 11 of the cage 1, facing in a radial direction 10, in a (post-radial compression) first region 12B of the ball guiding surfaces 8D of the cage windows 4, the cage 1 is deformed in the first region 12B, so that the ball guiding surfaces 8D are displaced inwardly in the radial direction 10 with respect to the respectively adjacent second regions 13 of the cage 1. The cage 1 has in the first region 12 of the ball guiding surface 8D a wall portion 20 that is displaced inwardly in the radial direction with respect to the adjacently arranged second region 13.

Here, too, the cage 1 has a spherically formed outer circumferential surface 11 and also a spherically formed inner circumferential surface 28.

During step c) of the method, and in particular also during an upsetting operation following step i), a wall thickness 15 (measured in the radial direction 10) of the cage 1 in the first region 12B of the ball guiding surface 8D remains constant. Therefore, no flow of material into the first region 12B of the ball guiding surface 8D takes place, but instead the material present in the first region 12B is displaced in the radial direction 10 with respect to the adjacent second regions 13.

After step c), the cage 1 has in the first region 12B of the ball guiding surface 8 a smallest inside diameter 18 and a smallest outside diameter 19 in a cross section 16 transverse to an axis of rotation 17 of the cage 1. The smallest inside diameter 18 differs from an inside diameter 21 of a second region 13 of the cage 1 that is arranged directly alongside. The same applies to the smallest outside diameter 19 (in comparison with an outside diameter of a second region 13 of the cage 1 that is arranged directly alongside).

The cage 1 extends in the axial direction 7 between a first end face 22 and a second end face 23, wherein the cage 1 has, between the ball guiding surface 8D and each end face 22, 23 in the axial direction 7, lands 24 running in the circumferential direction 3. At least a part 25A of the land 24 that extends in the axial direction 7 is displaced inwardly in the radial direction 10 in a first region 12B with respect to a second region 13 of the cage 1 that is adjacent (in the circumferential direction 3 and/or in the axial direction 7 toward the end face 22, 23) (here the part 25A extends in the axial direction 7 over the entire land 24).

The distance 27 between the ball guiding surfaces 8D in the axial direction 7 can be set directly by step c) or by an upsetting operation, which is carried out after a step i), possibly after step c). The distance 27 may also be set by mechanical working after step c) or after the upsetting operation.

Figure 9:
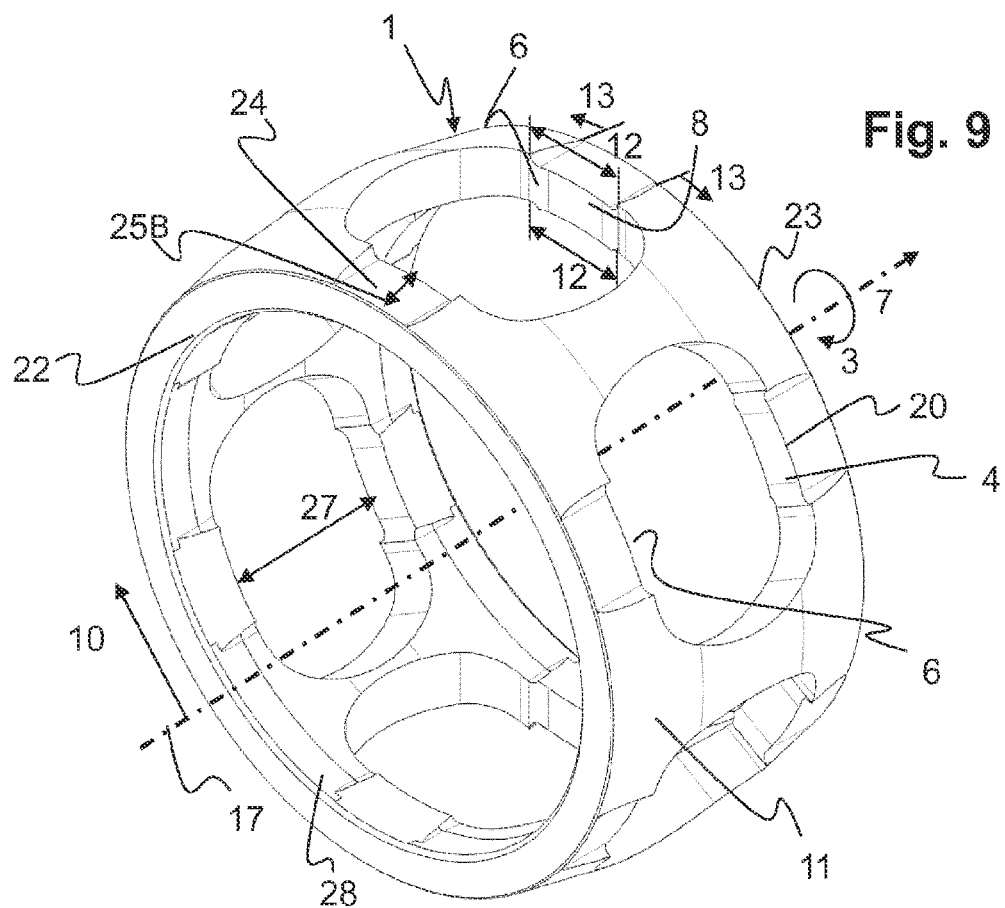
FIG. 9: a further variant of the embodiment of the cage in a perspective view.

FIG. 9 shows a further variant of the embodiment of the cage 1 in a perspective view. Reference is made to the statements made with respect to FIG. 8. As a difference from the cage 1 shown in FIG. 8, here only a part 25B of the lands 24 that extends in the axial direction 7 is displaced inwardly in the radial direction 10 in a first region 12 with respect to a second region 13 of the cage 1 that is adjacent in the circumferential direction 3 and in the axial direction 7 toward the end face 22, 23. In comparison with the variant of the embodiment in FIG. 8, here the part 25B only extends in the axial direction 7 from the cage window 4 up to the end faces 22, 23, while at the end face 22, 23 itself the land 24 is not displaced inwardly in the radial direction 10.

The method allows a defined re-forming of the cage 1 in partial regions, so that a ball guiding surface 8 can be arranged further inward in the radial direction 10. This displacement prevents damage to the cage 1 during operation of a constant-velocity ball joint, because the contact point 26 of the ball 5 with the ball guiding surface 8 is then arranged at a greater distance from the inner circumferential surface 28.

LIST OF REFERENCE NUMBERS

1 Cage
2 Constant-velocity ball joint
3 Circumferential direction
4 Cage window
5 Ball
6 Side
7 Axial direction
8 Ball guiding surface
9 Compressive force
10 Radial direction
11 Outer circumferential surface
12 First region
13 Second region
14 Calibrating mandrel
15 Wall thickness
16 Cross section
17 Axis of rotation
18 Smallest inside diameter
19 Smallest outside diameter
20 Wall portion
21 Inside diameter
22 First end face
23 Second end face
24 Land
25 Part
26 Contact point
27 Distance
28 Inner circumferential surface

The invention claimed is:

1. A cage for a constant-velocity ball joint,
wherein the cage is annular and has cage windows which are arranged spaced apart from one another along a circumferential direction and are intended for guiding balls of the constant-velocity ball joint;
wherein each cage window has at least on one side a ball guiding surface facing in an axial direction;
wherein the cage has in a first region of the ball guiding surface a smallest inside diameter and a smallest outside diameter in a cross section transverse to an axis of rotation of the cage,
wherein the cage has in the first region of the ball guiding surface a wall portion that is displaced inwardly in the radial direction with respect to an adjacently arranged second region; and
wherein the smallest inside diameter differs from an inside diameter of the second region of the cage that is arranged directly alongside by at most 1%.

2. The cage of claim 1,
wherein the cage extends in the axial direction between a first end face and a second end face,
wherein the cage has between the ball guiding surface and each end face in the axial direction lands running in the circumferential direction, and
wherein at least a part of at least one land that extends in the axial direction is displaced inwardly in the radial direction in the first region with respect to the second region of the cage that is adjacent.

3. The cage of claim 2, wherein the land between the ball guiding surface and at least one end face is entirely displaced inwardly in the radial direction in the first region with respect to the second region of the cage that is adjacent.

4. A cage for a constant-velocity ball joint,
wherein the cage is annular and has cage windows which are arranged spaced apart from one another along a circumferential direction and are intended for guiding balls of the constant-velocity ball joint;
wherein each cage window has at least on one side a ball guiding surface facing in an axial direction;

wherein the cage has in a first region of the ball guiding surface a smallest inside diameter and a smallest outside diameter in a cross section transverse to an axis of rotation of the cage, wherein the cage has in the first region of the ball guiding surface a wall portion that is displaced inwardly in the radial direction with respect to an adjacently arranged second region;

wherein the cage extends in the axial direction between a first end face and a second end face, wherein the cage has between the ball guiding surface and each end face in the axial direction lands running in the circumferential direction, wherein at least a part of at least one land that extends in the axial direction is displaced inwardly in the radial direction in the first region with respect to the second region of the cage that is adjacent; and wherein the land between the ball guiding surface and at least one end face is entirely displaced inwardly in the radial direction in the first region with respect to the second region of the cage that is adjacent.

5. A system comprising:

a constant-velocity ball joint and a cage, wherein the cage is annular and has cage windows which are arranged spaced apart from one another along a circumferential direction and are intended for guiding balls of the constant-velocity ball joint;

wherein each cage window has at least on one side a ball guiding surface facing in an axial direction;

wherein the cage has in a first region of the ball guiding surface a smallest inside diameter and a smallest outside diameter in a cross section transverse to an axis of rotation of the cage, wherein the cage has in the first region of the ball guiding surface a wall portion that is displaced inwardly in the radial direction with respect to an adjacently arranged second region, wherein the constant-velocity ball joint is a constant-velocity slip ball joint, in which the cage is arranged displaceably along an axial direction; and wherein the cage is deformed in the first region of the at least one ball guiding surface in such a way that the at least one ball guiding surface is additionally displaced in the axial direction with respect to the adjacent second region of the cage.

6. A method for producing a cage for a constant-velocity ball joint, wherein the cage is annular and has cage windows for guiding balls of the constant-velocity ball joint that are arranged spaced apart from one another along a circumferential direction; wherein each cage window has at least on one side a ball guiding surface facing in an axial direction, the method comprising:

a) providing a cage having cage windows;

b) applying at least one compressive force via an outer circumferential surface of the cage, facing in a radial direction, in a first region of at least one ball guiding surface of at least one cage window; and c) deforming the cage in the first region of the at least one ball guiding surface, so that the at least one ball guiding surface is displaced inwardly in the radial direction with respect to an adjacent second region of the cage;

wherein, in step c), the cage is deformed in the first region of the at least one ball guiding surface in such a way that the at least one ball guiding surface is additionally displaced in the axial direction with respect to the adjacent second region of the cage.

7. The method of claim 6, wherein, between steps a) and b) or after step c), in a further step i), a calibrating mandrel is arranged in at least one cage window; wherein, at least during step c) or in an upsetting operation following step i), the at least one ball guiding surface comes to lie against the calibrating mandrel.

8. The method of claim 6, wherein the at least one cage window has, on each of both sides lying opposite one another, a ball guiding surface, wherein, in step c), both ball guiding surfaces are at least displaced inwardly in the radial direction with respect to the second regions of the cage that are adjacent.

9. The method of claim 6, wherein a wall thickness of the cage in the first region of the ball guiding surface remains constant during step c).

10. A method for producing a cage for a constant-velocity ball joint, wherein the cage is annular and has cage windows for guiding balls of the constant-velocity ball joint that are arranged spaced apart from one another along a circumferential direction; wherein each cage window has at least on one side a ball guiding surface facing in an axial direction, the method comprising:

a) providing a cage having cage windows;

b) applying at least one compressive force via an outer circumferential surface of the cage, facing in a radial direction, in a first region of at least one ball guiding surface of at least one cage window; and c) deforming the cage in the first region of the at least one ball guiding surface, so that the at least one ball guiding surface is displaced inwardly in the radial direction with respect to an adjacent second region of the cage;

wherein, between steps a) and b) or after step c), in a further step i), a calibrating mandrel is arranged in at least one cage window; wherein, at least during step c) or in an upsetting operation following step i), the at least one ball guiding surface comes to lie against the calibrating mandrel.

* * * * *